United States Patent
Kang et al.

(10) Patent No.: US 12,218,735 B2
(45) Date of Patent: *Feb. 4, 2025

(54) METHOD AND DEVICE FOR TRANSMITTING OR RECEIVING SIGNAL ON BASIS OF SPACE PARAMETER IN WIRELESS COMMUNICATION SYSTEM

(71) Applicant: LG ELECTRONICS INC., Seoul (KR)

(72) Inventors: Jiwon Kang, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 252 days.

This patent is subject to a terminal disclaimer.

(21) Appl. No.: 17/796,574

(22) PCT Filed: Mar. 5, 2021

(86) PCT No.: PCT/KR2021/002758
§ 371 (c)(1),
(2) Date: Jul. 29, 2022

(87) PCT Pub. No.: WO2021/177782
PCT Pub. Date: Sep. 10, 2021

(65) Prior Publication Data
US 2023/0052430 A1    Feb. 16, 2023

(30) Foreign Application Priority Data

Mar. 6, 2020  (KR) ........................ 10-2020-0028295

(51) Int. Cl.
*H04B 7/08*    (2006.01)
*H04B 7/06*    (2006.01)
(Continued)

(52) U.S. Cl.
CPC ......... *H04B 7/0868* (2013.01); *H04B 7/0626* (2013.01); *H04L 27/26025* (2021.01)

(58) Field of Classification Search
CPC .. H04B 7/0868; H04B 7/0626; H04B 7/0632; H04B 7/0695; H04B 7/088;
(Continued)

(56) References Cited

U.S. PATENT DOCUMENTS

2021/0092627 A1*  3/2021  Radulescu ............ H04L 5/0053
2021/0112540 A1*  4/2021  Zewail ................... H04W 72/23
(Continued)

FOREIGN PATENT DOCUMENTS

WO    2019066618 A1    4/2019
WO    2019099659 A1    5/2019
(Continued)

OTHER PUBLICATIONS

"Leftover issues on aperiodic CSI-RS", ZTE, 3GPP TSG RAN WG1 Meeting #97, Reno, USA, May 13-17, 2019, R1-1906252.
(Continued)

*Primary Examiner* — Harry H Kim
(74) *Attorney, Agent, or Firm* — BRYAN CAVE LEIGHTON PAISNER LLP

(57) ABSTRACT

Disclosed are a method and a device for transmitting or receiving a signal on the basis of a space parameter in a wireless communication system. A method for performing downlink reception or uplink transmission by a terminal in a wireless communication system according to an embodiment of the present disclosure may comprise the steps of: transmitting information related to a beam switching time of the terminal to a base station; receiving, from the base station, downlink control information (DCI) including information on the downlink reception or the uplink transmission; and on the basis of the beam switching time and a
(Continued)

predetermined threshold value, applying one space parameter set among multiple space parameter sets so as to perform the downlink reception or the uplink transmission, wherein at least one of the beam switching time and the predetermined threshold value may be based on at least one of subcarrier spacing, the position of a frequency, a capability of the terminal, and a cyclic prefix (CP)-related configuration.

8 Claims, 18 Drawing Sheets

(51) Int. Cl.
    *H04J 11/00*       (2006.01)
    *H04L 5/00*        (2006.01)
    *H04L 27/26*      (2006.01)
    *H04W 8/22*       (2009.01)
    *H04W 72/232*    (2023.01)
    *H04W 88/02*     (2009.01)

(58) Field of Classification Search
    CPC ............ H04B 7/0408; H04L 27/26025; H04L 5/0023; H04L 5/005; H04L 5/0094; H04L 5/0048; H04L 27/2678; H04W 8/22; H04W 88/02; H04W 72/23; H04J 11/00; Y02D 30/70
    See application file for complete search history.

(56) References Cited

U.S. PATENT DOCUMENTS

| | | | |
|---|---|---|---|
| 2023/0007667 A1* | 1/2023 | Matsumura | H04L 5/0094 |
| 2023/0052430 A1 | 2/2023 | Kang et al. | |
| 2023/0076897 A1 | 3/2023 | Svedman et al. | |
| 2023/0171062 A1* | 6/2023 | Khoshnevisan | H04L 5/0085 370/329 |

FOREIGN PATENT DOCUMENTS

| | | |
|---|---|---|
| WO | 2020041757 A1 | 2/2020 |
| WO | 2020170444 | 12/2021 |

OTHER PUBLICATIONS

"Draft CR summary for beam management and QCL", Ericsson, 3GPP TSG-RAN WG1 Meeting #96bis, Xian, Apr. 8-12, 2019, Tdoc R1-1905636.

"Enhancements on Multi-beam Operation", Qualcomm Incorporated, 3GPP TSG-RAN WG1 Meeting #99, Reno, Nevada, US, Nov. 18-22, 2019, R1-1912968.

"FL summary update on A-CSI triggering with different numerology", Nokia, Nokia Shanghai Bell, 3GPP TSG RAN WG1 #100 e-meeting, Feb. 18-Mar. 6, 2020, R1-2001146.

3GPP TS 38.201 V16.0.0 (Dec. 2019) 3rd Generation Partnership Project; Technical Specification Group Radio Access Network; NR; Physical layer; General description (Release 16).

3GPP TS 38.306 v15.8.0 (Dec. 2019) 3rd Generation Partnership Project; Technical Specification Group Radio Access Network; NR; User Equipment (UE) radio access capabilities (Release 15).

Ericsson, "On support of aperiodic CS1-RS triggering with mixed numerology," 3GPP TSG-RAN WG1 Meeting #98bis Tdoc R1-1910898, dated Oct. 2019.

Ericsson, "On the handling of beamSwitchTiming values of 224 and 336," 3GPP TSG-RAN WG1 Meeting #100-e, Tdoc R1-2001081, dated Mar. 2020.

Ericsson, et al. "Correction to aperiodic CSI-RS triggering with different numerology between PDCCH and CS1-RS," 3GPP TSG RAN Meeting #83, RP-190505, dated Mar. 2019.

Vivo, "Remaining issues on aperiodic CSI-RS triggering", 3GPP TSG RAN WG1 #100, R1-2000348, e-Meeting, Feb. 24-Mar. 6, 2020.

\* cited by examiner

METHOD AND DEVICE FOR TRANSMITTING OR RECEIVING SIGNAL ON BASIS OF SPACE PARAMETER IN WIRELESS COMMUNICATION SYSTEM

CROSS-REFERENCE TO RELATED APPLICATIONS

This application is the National Stage filing under 35 U.S.C. 371 of International Application No. PCT/KR2021/002758, filed on Mar. 5, 2021, which claims the benefit of Korean Application No. 10-2020-0028295, filed on Mar. 6, 2020, the contents of which are all hereby incorporated by reference herein in their entirety.

TECHNICAL FIELD

The present disclosure relates to a wireless communication system, and in more detail, relates to a method and an apparatus of transmitting and receiving a signal based on a spatial parameter in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical problem of the present disclosure is to provide a method and an apparatus of transmitting and receiving a signal based on a spatial parameter.

An additional technical problem of the present disclosure is to provide a method and an apparatus of determining a spatial parameter based on beam switching timing of a terminal and performing uplink signal transmission or downlink signal reception based on a determined spatial parameter.

The technical objects to be achieved by the present disclosure are not limited to the above-described technical objects, and other technical objects which are not described herein will be clearly understood by those skilled in the pertinent art from the following description.

Technical Solution

In a method of performing downlink reception or uplink transmission by a terminal in a wireless communication system according to an aspect of the present disclosure, the method may include transmitting, to a base station, information related to a beam switching timing of the terminal, receiving, from the base station, downlink control information (DCI) including information for the downlink reception or the uplink transmission and performing the downlink reception or the uplink transmission with applying a spatial parameter set among a plurality of spatial parameter sets, based on the beam switching timing and a predetermined threshold, and at least one of the beam switching timing or the predetermined threshold may be based on at least one of a subcarrier spacing, a frequency position, a capability of the terminal, or a configuration related to a cyclic prefix (CP).

In a method of performing downlink transmission or uplink reception by a base station in a wireless communication system according to an additional aspect of the present disclosure, the method may include receiving, from a terminal, information related to a beam switching timing of the terminal, transmitting, to the terminal, downlink control information (DCI) including information for the downlink transmission or the uplink reception and performing the downlink transmission or the uplink reception with applying a spatial parameter set among a plurality of spatial parameter sets, based on the beam switching timing and a predetermined threshold, and at least one of the beam switching timing or the predetermined threshold may be based on at least one of a subcarrier spacing, a frequency position, a capability of the terminal, or a configuration related to a cyclic prefix (CP).

Technical Effects

According to the present disclosure, a method and an apparatus of transmitting and receiving a signal based on a spatial parameter may be provided.

According to the present disclosure, a method and an apparatus of determining a spatial parameter based on beam switching timing of a terminal and performing uplink signal transmission or downlink signal reception based on a determined spatial parameter may be provided.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
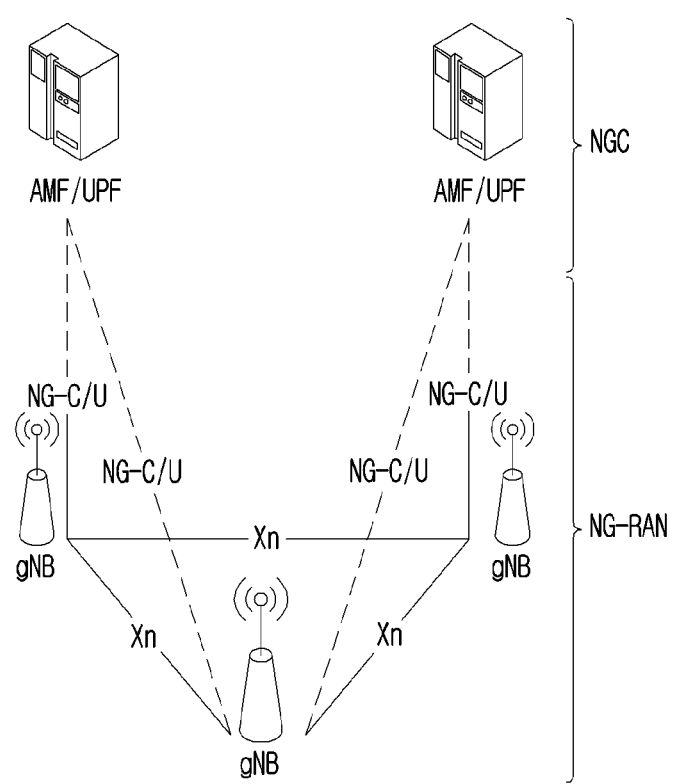
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36. xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), Sss (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
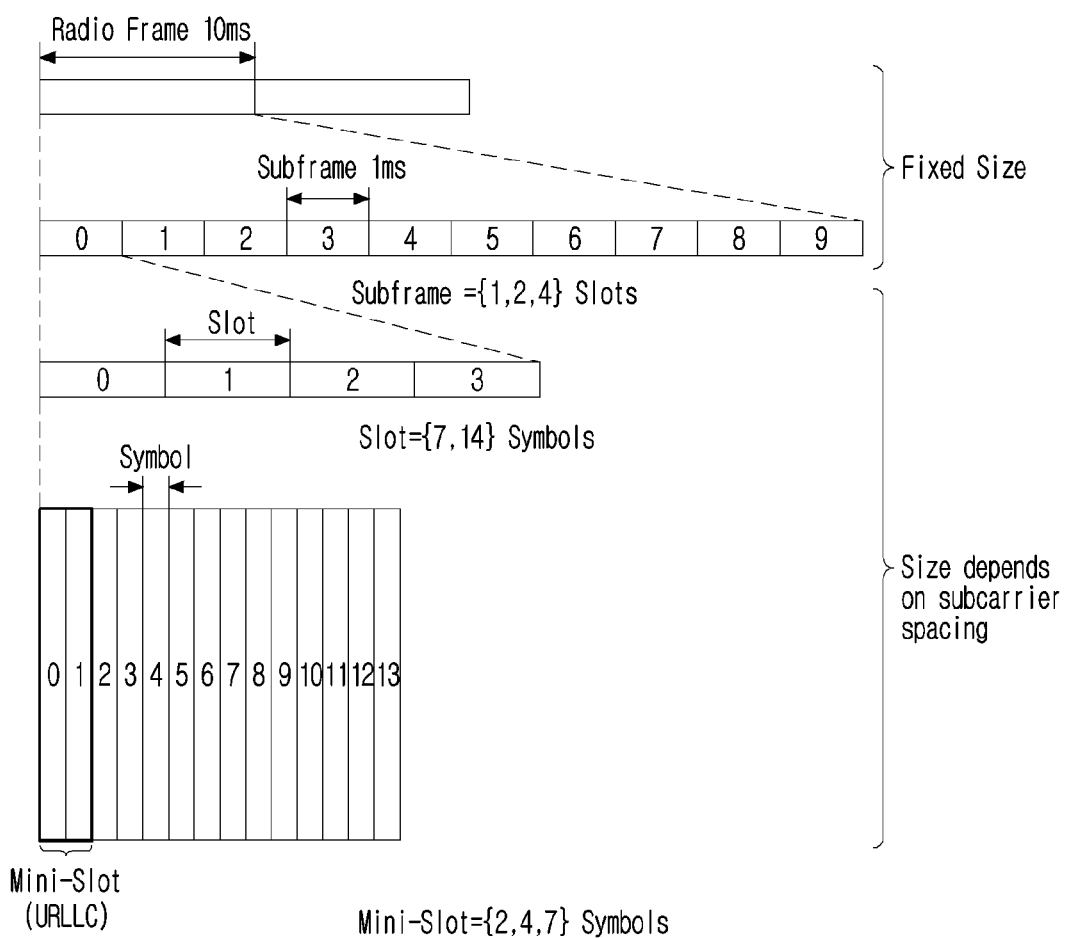
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset}) \cdot T_c$ than a corresponding downlink frame in a corresponding terminal starts. For a subcarrier spacing configuration $\mu$, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 2 is an example on $\mu=2$ (SCS is 60 kHz), 1 subframe may include 4 slots referring to Table 3. 1 subframe={1, 2, 4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
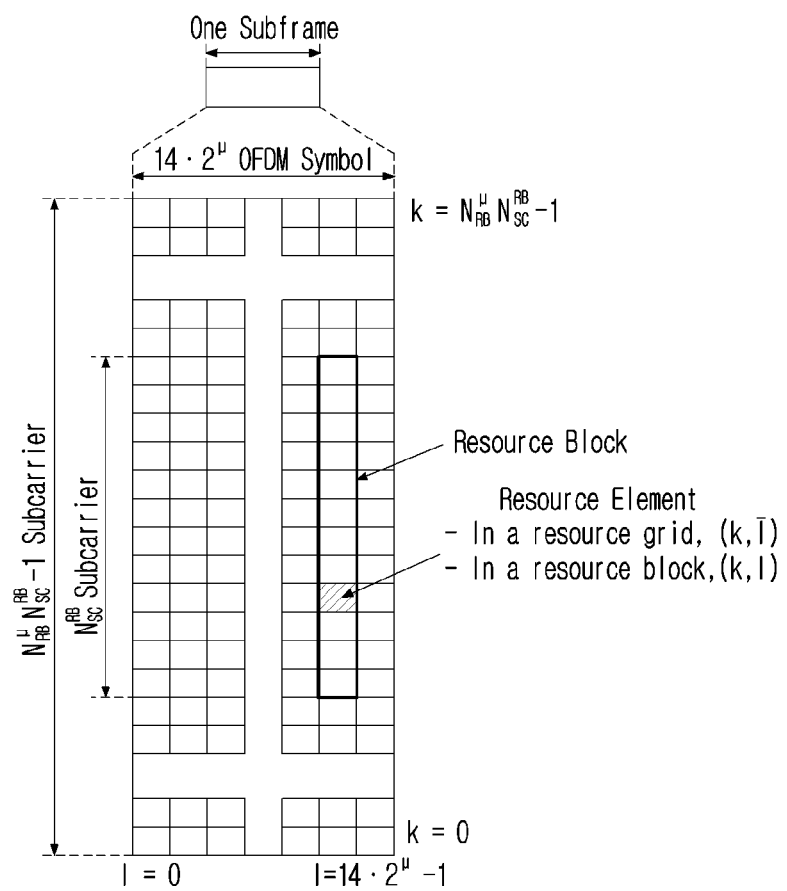
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per u and antenna port p. Each element of a resource grid for u and an antenna port p is referred to as a resource element and is uniquely identified by an index pair (k, l'). Here, k=0, . . . , $N_{RB}^\mu N_{sc}^{RB}-1$ is an index in a frequency domain and l'=0, . . . , $2^{\mu N}{}_{symb}{}^{(\mu)}-1$ refers to a position of a symbol in a subframe. When referring to a resource element in a slot, an index pair (k, l) is used. Here, l=0, . . . , $N_{symb}^\mu-1$. A resource element (k, l') for u and an antenna port p corresponds to a complex value, $a_{k,l}{}'(p, \mu)$. When there is no risk of confusion or when a specific antenna port or numerology is not specified, indexes p and u may be dropped, whereupon a complex value may be $a_{k,l}{}'(p)$ or $a_{k,l}{}'$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration µ. The center of subcarrier 0 of common resource block 0 for a subcarrier spacing configuration u is identical to 'point A'. A relationship between a common resource block number $n_{CRB}^\mu$ and a resource element (k, l) for a subcarrier spacing configuration u in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block nPRB and a common resource block $n_{cRB}$ in BWP i is given by the following Equation 2.

$$n_{CRB}^\mu = n_{PRB}^\mu + N_{BWP,i}^{start,\mu} \quad \text{[Equation 2]}$$

$N_{BWP,i}^{start,\mu}$ is a common resource block that a BWP starts relatively to common resource block 0.

Figure 4:
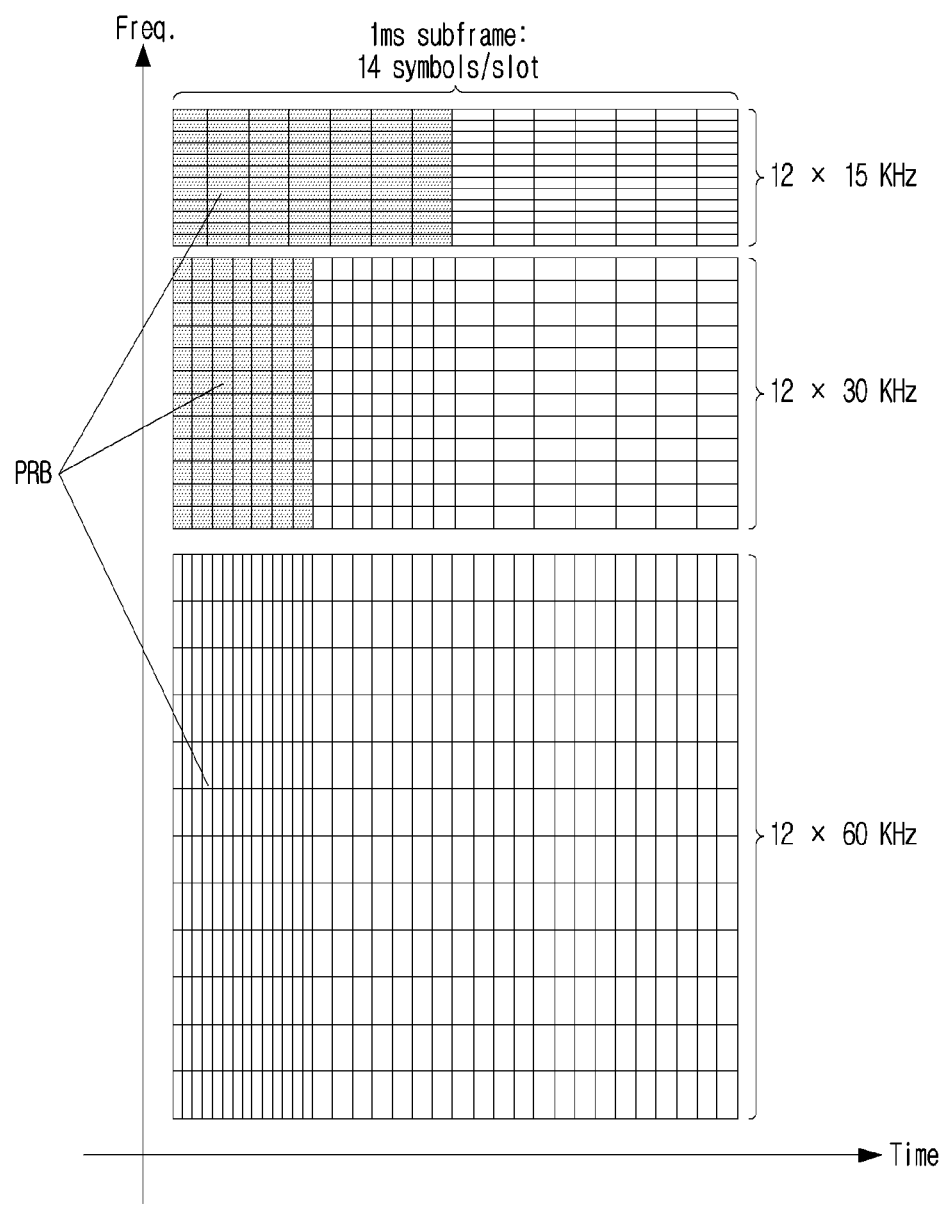
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
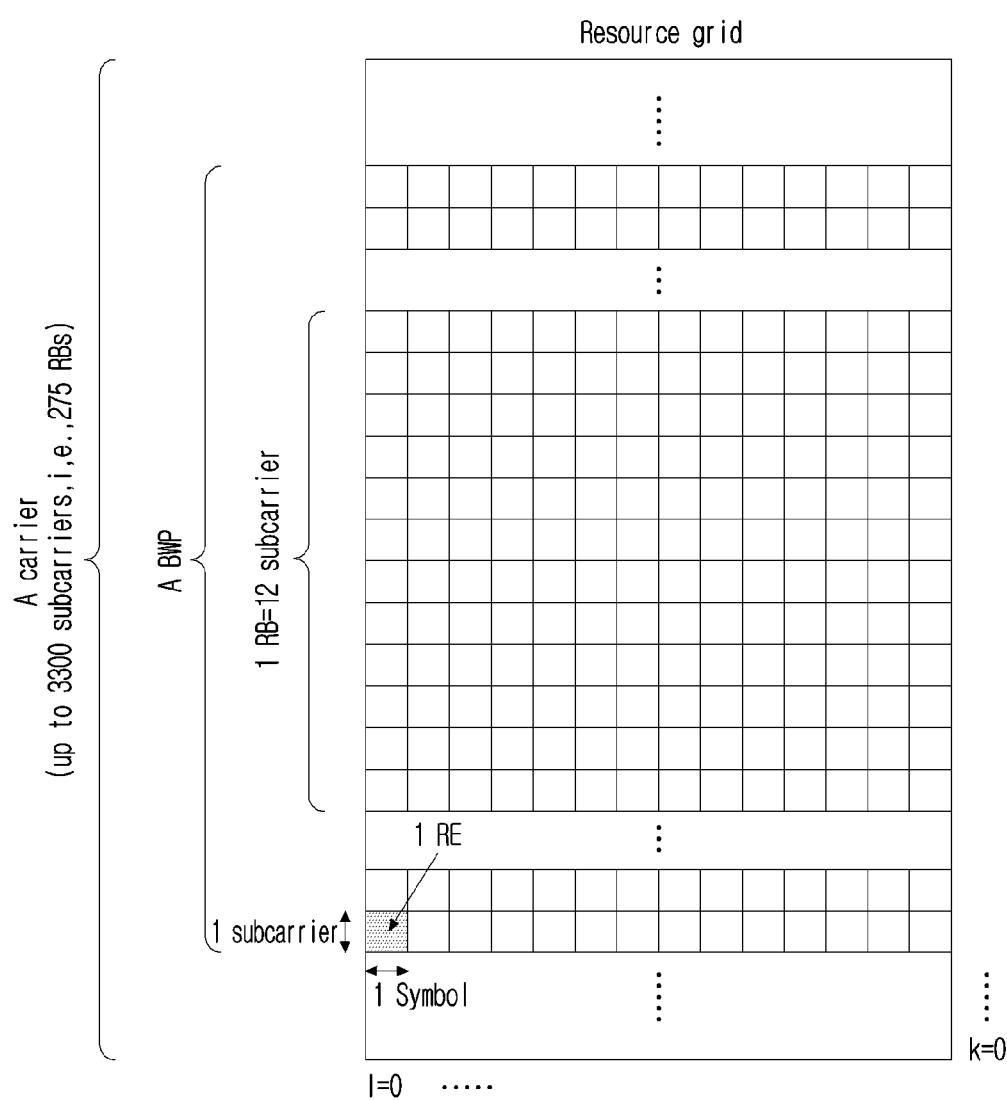
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
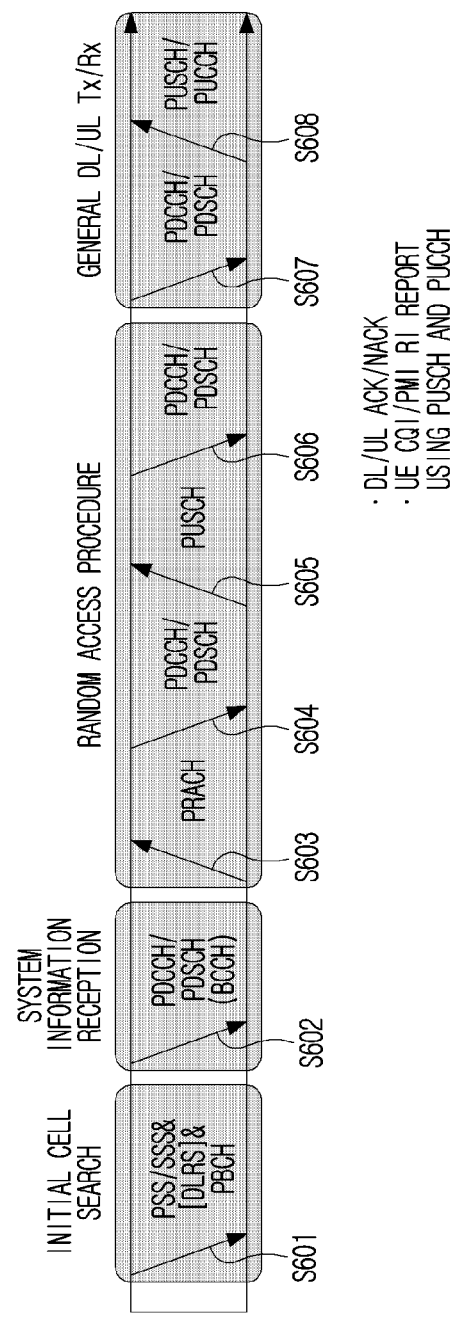
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a COI (Channel Quality Indicator), a PMI (Precoding Matrix Indicator), a RI (Rank Indicator), etc. For a 3GPP LTE system, a terminal may transmit control information of the above-described COI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

beam management (BM)

A BM procedure is L1 (layer 1)/L2 (layer 2) procedures to obtain and maintain a set of beams of a base station (e.g., a gNB, a TRP, etc.) and/or terminal (e.g., a UE) beams which may be used for downlink (DL) and uplink (UL) transmission/reception, it may include the following procedures and terms.

- Beam measurement: An operation that a base station or a UE measures a property of a received beamformed signal
- Beam determination: An operation that a base station or a UE selects its Tx beam/Rx beam
- Beam sweeping: An operation that a spatial region is covered by using a Tx and/or Rx beam for a certain time interval in a pre-determined method
- Beam report: An operation that a UE reports information of a beamformed signal based on beam measurement A BM procedure may be classified into (1) a DL BM procedure using a SS (synchronization signal)/PBCH (physical broadcast channel) Block or a CSI-RS and (2) an UL BM procedure using an SRS (sounding reference signal).

In addition, each BM procedure may include Tx beam sweeping for determining a Tx Beam and Rx beam sweeping for determining a Rx beam.

Hereinafter, a DL BM procedure will be described.

A DL BM procedure may include (1) transmission of beamformed DL RSs (reference signals) of a base station (e.g., a CSI-RS or a SS Block (SSB)) and (2) beam reporting of a terminal.

Here, beam reporting may include preferred DL RS ID (identifier) (s) and corresponding L1-RSRP (Reference Signal Received Power).

The DL RS ID may be a SSBRI (SSB Resource Indicator) or a CRI (CSI-RS Resource Indicator).

Hereinafter, a DL BM procedure using an SSB will be described.

Figure 7:
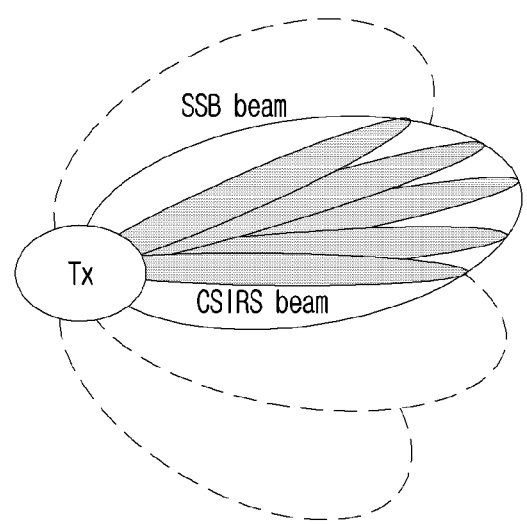
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both of Tx beam sweeping and Rx beam sweeping.

Rx beam sweeping using an SSB may be performed while an UE changes an Rx beam for the same SSBRI across a plurality of SSB bursts. In this case, one SS burst includes one or more SSBs and one SS burst set includes one or more SSB bursts.

Figure 8:
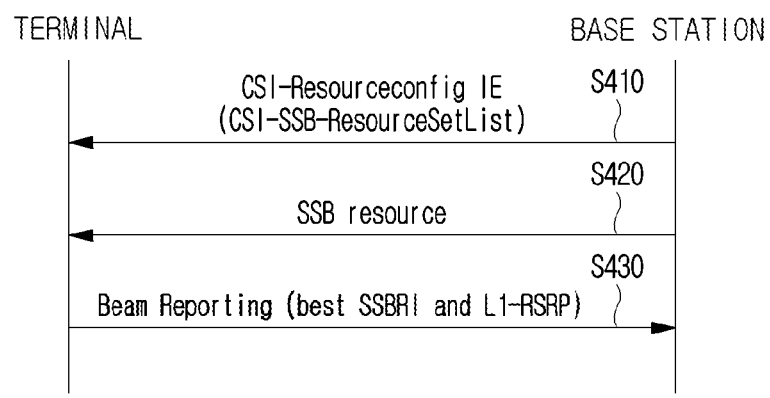
FIG. 8 is a diagram which illustrates a downlink beam management procedure using SSB in a wireless communication system to which the present disclosure may be applied.

FIG. 8 is a diagram which illustrates a downlink beam management procedure using SSB in a wireless communication system to which the present disclosure may be applied.

A configuration on a beam report using an SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station (S410).

Table 6 represents an example of CSI-ResourceConfig IE and as in Table 6, a BM configuration using an SSB configures an SSB like a CSI-RS resource without being separately defined.

TABLE 6

```
ASN1START
TAG-CSI-RESOURCECONFIG-START
CSI-ResourceConfig ::=         SEQUENCE {
csi-ResourceConfigId           CSI-ResourceConfigId,
csi-RS-ResourceSetList         CHOICE {
nzp-CSI-RS-SSB                 SEQUENCE {
nzp-CSI-RS-ResourceSetList     SEQUENCE           (SIZE
(1..maxNrofNZP-CSI-RS-ResourceSetsPerConfig))  OF  NZP-CSI-RS-
ResourceSetId OPTIONAL,
csi-SSB-ResourceSetList        SEQUENCE           (SIZE
(1..maxNrofCSI-SSB-ResourceSetsPerConfig))  OF  CSI-SSB-
ResourceSetId OPTIONAL
},
csi-IM-ResourceSetList         SEQUENCE           (SIZE
(1..maxNrofCSI-IM-ResourceSetsPerConfig))  OF  CSI-IM-
ResourceSetId
},
bwp-Id                         BWP-Id,
resourceType                   ENUMERATED        { aperiodic,
semiPersistent, periodic },
```

TABLE 6-continued

```
...
}
TAG-CSI-RESOURCECONFIGTOADDMOD-STOP
-- ASN1STOP
```

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, . . . }. An SSB index may be defined from 0 to 63. A terminal receives an SSB resource from the base station based on the CSI-SSB-ResourceSetList (S420).

When CSI-RS reportConfig related to a report on a SSBRI and L1-RSRP is configured, the terminal performs (beam) reporting of the best SSBRI and corresponding L1-RSRP to a base station (S430).

Hereinafter, a DL BM procedure using a CSI-RS will be described.

Describing a usage of a CSI-RS, i) a repetition parameter is configured for a specific CSI-RS resource set and when TRS_info is not configured, a CSI-RS is used for beam management. ii) when a repetition parameter is not configured and TRS_info is configured, a CSI-RS is used for a TRS (tracking reference signal). iii) when a repetition parameter is not configured and TRS_info is not configured, a CSI-RS is used for CSI acquisition.

Such a repetition parameter may be configured only for CSI-RS resource sets associated with CSI-ReportConfig having a report of L1 RSRP or 'No Report (or None)'.

If a terminal is configured with CSI-ReportConfig in which reportQuantity is configured as 'cri-RSRP' or 'none' and CSI-ResourceConfig for channel measurement (a higher layer parameter resourcesForChannelMeasurement) does not include a higher layer parameter 'trs-Info' and includes NZP-CSI-RS-ResourceSet in which a higher layer parameter 'repetition' is configured, the terminal may be configured only with a same number of port (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted with the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted in a different OFDM symbol. In addition, a terminal does not expect to receive a different periodicity in periodicityAndOffset in all CSI-RS resources in NZP-CSI-RS-Resourceset.

Meanwhile, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted in the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and corresponding L1-RSRP to a base station.

In addition, when a CSI-RS resource may be configured in the same OFDM symbol(s) as an SSB (SS/PBCH Block) and 'QCL-TypeD' is applicable, the terminal may assume that a CSI-RS and an SSB are quasi co-located with regard to 'QCL-TypeD'.

Here, the QCL TypeD may mean that antenna ports are quasi-colocated with regard to a spatial Rx parameter. When a terminal receives a plurality of DL antenna ports in a QCL Type D relationship, it is allowed to apply the same Rx beam. In addition, a terminal does not expect that a CSI-RS will be configured in a RE overlapped with a RE of an SSB.

Figure 9:
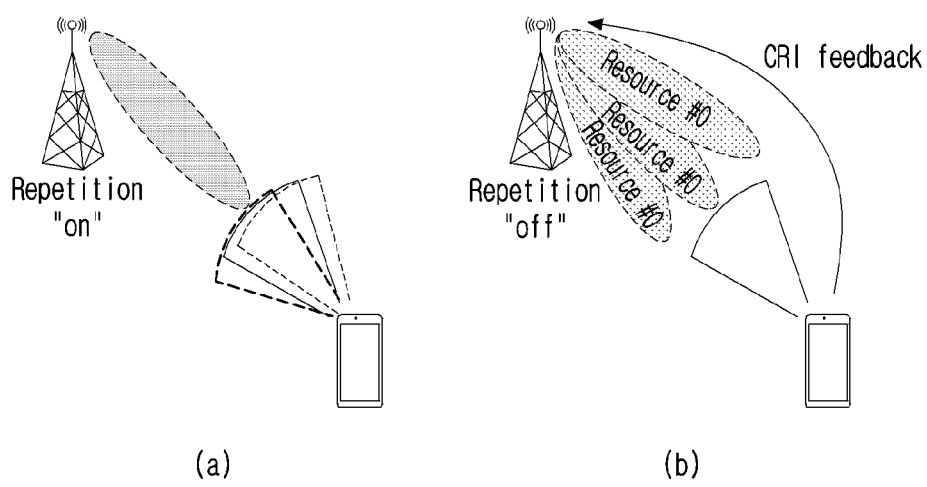
FIG. 9 is a diagram which illustrates a downlink beam management operation using CSI-RS in a wireless communication system to which the present disclosure may be applied.

FIG. 9 is a diagram which illustrates a downlink beam management operation using CSI-RS in a wireless communication system to which the present disclosure may be applied.

FIG. 9(a) represents a Rx beam determination (or refinement) procedure of a terminal and FIG. 9(b) represents a Tx beam sweeping procedure of a base station. In addition, FIG. 9(a) is a case when a repetition parameter is configured as 'ON' and FIG. 9(b) is a case when a repetition parameter is configured as 'OFF'.

Figure 10:
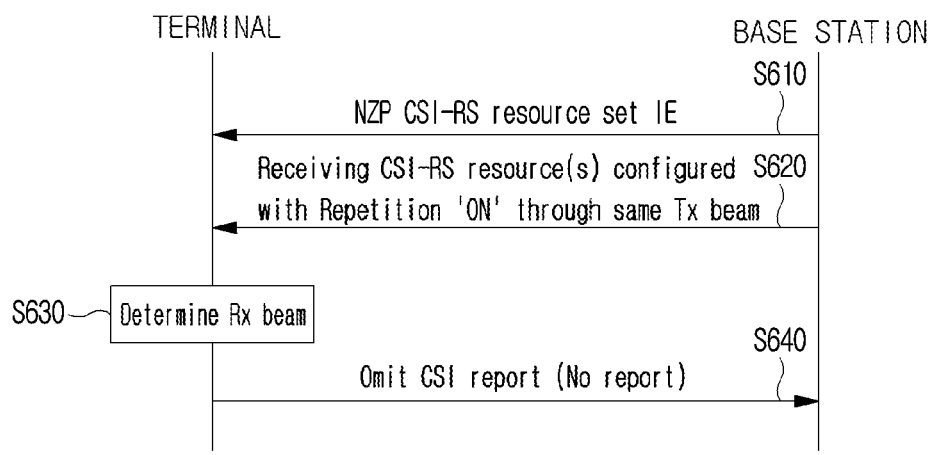
FIG. 10 is a diagram which illustrates an Rx beam determination process of a terminal in a wireless communication system to which the present disclosure may be applied.

FIG. 10 is a diagram which illustrates an Rx beam determination process of a terminal in a wireless communication system to which the present disclosure may be applied.

In reference to FIG. 9(a) and FIG. 10, an Rx beam determination process of a terminal is described.

A terminal receives NZP CSI-RS resource set IE including a higher layer parameter repetition through RRC signaling from a base station (S610). Here, the repetition parameter is configured as 'ON'.

A terminal repetitively receives resources in a CSI-RS resource set configured as repetition 'ON' through the same Tx beam (or DL spatial domain transmission filter) of a base station in a different OFDM symbol (S620).

A terminal determines its Rx beam (S630).

A terminal omits a CSI report (S640). In this case, reportQuantity of a CSI report configuration may be configured as 'No report (or None)'.

In other words, the terminal may omit a CSI report when it is configured as repetition 'ON'.

Figure 11:
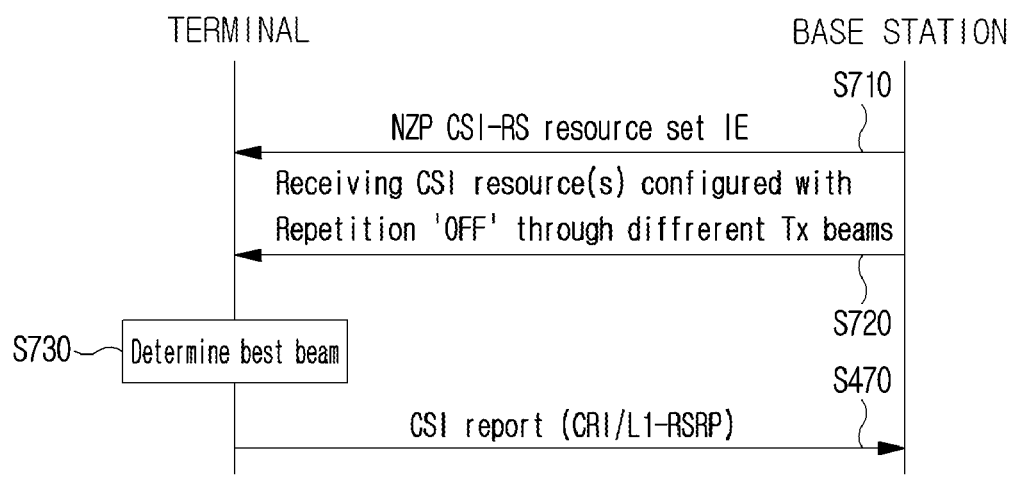
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(b) and FIG. 11, a Tx beam determination process of a base station is described.

A terminal receives NZP CSI-RS resource set IE including a higher layer parameter repetition through RRC signaling from a base station (S710). Here, the repetition parameter is configured as 'OFF' and it is related to a Tx beam sweeping procedure of a base station.

A terminal receives resources in a CSI-RS resource set configured as repetition 'OFF' through a different Tx beam (or DL spatial domain transmission filter) of a base station (S720).

A terminal selects (or determines) the best beam (S740).

A terminal reports an ID and related quality information (e.g., L1-RSRP) of a selected beam to a base station (S740). In this case, reportQuantity of a CSI report configuration may be configured as 'CRI+L1-RSRP'.

In other words, when a CSI-RS is transmitted for BM, the terminal reports a CRI and a related L1-RSRP.

Figure 12:
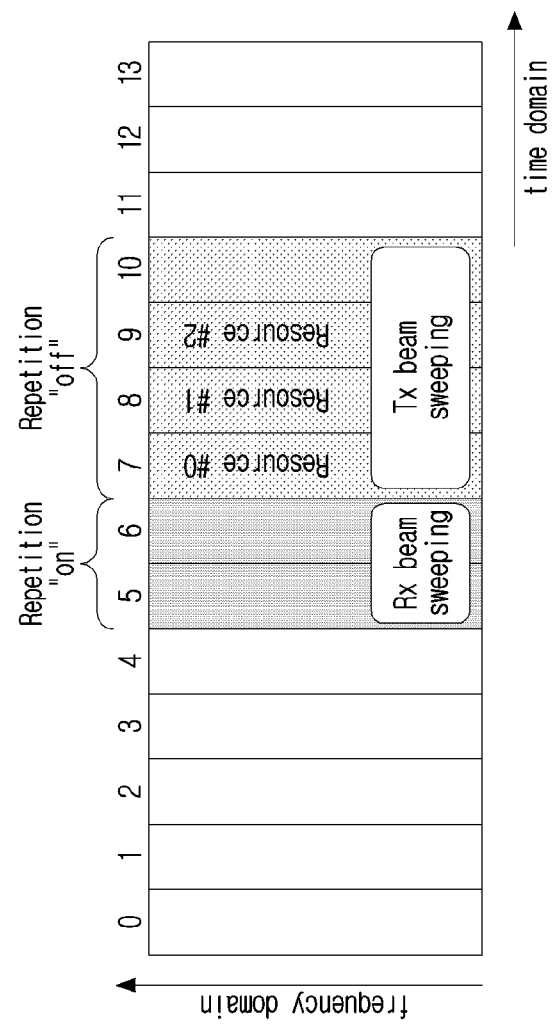
FIG. 12 is a diagram which illustrates resource allocation in a time and frequency domain related to a downlink beam management operation in a wireless communication system to which the present disclosure may be applied.

FIG. 12 is a diagram which illustrates resource allocation in a time and frequency domain related to a downlink beam management operation in a wireless communication system to which the present disclosure may be applied.

In reference to FIG. 12, it is shown that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted in a different Tx beam.

Hereinafter, a beam indication method related to downlink BM will be described.

A terminal may be configured by RRC with a list of a maximum M candidate transmission configuration indication (TCI) states at least for a purpose of a QCL (Quasi Co-location) indication. Here, M may be 64.

Each TCI state may be configured as one RS set. Each ID of a DL RS at least for a spatial QCL purpose (QCL Type D) in a RS set may refer to one of DL RS types such as an SSB, a P (periodic)-CSI RS, an SP (semi-persistent)-CSI RS, an A (aperiodic)-CSI RS, etc.

An ID of DL RS(s) in a RS set used at least for a purpose of a spatial QCL may be initialized/updated at least by explicit signaling.

Table 7 illustrates a TCI-State information element (IE).

A TCI-State IE is associated with a quasi co-location (QCL) type corresponding to one or two DL reference signals (RS).

TABLE 7

ASN1START
TAG-TCI-STATE-START
TCI-State ::=                SEQUENCE {
 tci-StateId                 TCI-StateId,
 qcl-Type1                   QCL-Info,
 qcl-Type2                   QCL-Info
           OPTIONAL,         -- Need R
...
}
QCL-Info ::=                 SEQUENCE {
 cell                        ServCellIndex
           OPTIONAL,         -- Need R
 bwp-Id                      BWP-Id
                             OPTIONAL, -- Cond CSI-RS-Indicated
 referenceSignal             CHOICE {
  csi-rs                     NZP-CSI-RS-ResourceId,
  ssb                        SSB-Index
 },
 qcl-Type                    ENUMERATED {typeA, typeB, typeC,
 typeD},
...
}
TAG-TCI-STATE-STOP
-- ASN1STOP In Table 7, a bwp-Id parameter represents a DL BWP (bandwidth part) where an RS is located, a cell parameter represents a carrier where a RS is located and a referencesignal parameter represents reference antenna port(s) which is a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated in NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

Hereinafter, uplink beam management will be described.

For UL BM, beam reciprocity (or beam correspondence) between a Tx beam and a Rx beam may be valid or may not be valid according to terminal implementation. If reciprocity between a Tx beam and a Rx beam is valid both in a base station and a terminal, a UL beam pair may be matched by a DL beam pair. But, when reciprocity between a Tx beam and a Rx beam is not valid in any one of a base station and a terminal, a process for determining a UL beam pair is required separately from a DL beam pair determination.

In addition, although both of a base station and a terminal maintain beam correspondence, a base station may use a UL BM procedure for determining a DL Tx beam without requesting a terminal to report a preferred beam.

UL BM may be performed through beamformed UL SRS transmission and whether UL BM of an SRS resource set is applied may be configured by a (higher layer parameter) usage. When a usage is configured as 'BeamManagement (BM)', only one SRS resource may be transmitted in each of a plurality of SRS resource sets in a given time instant.

A terminal may be configured with one or more SRS (Sounding Reference Symbol) resource sets configured by a (higher layer parameter) SRS-ResourceSet (through higher layer signaling, RRC signaling, etc.) For each SRS resource set, a UE may be configured with K≥1 SRS resources (a higher layer parameter SRS-resource). Here, K is a natural number and the maximum number of K is indicated by SRS_capability.

Like DL BM, an UL BM procedure may be also classified into Tx beam sweeping of a terminal and Rx beam sweeping of a base station.

Figure 13:
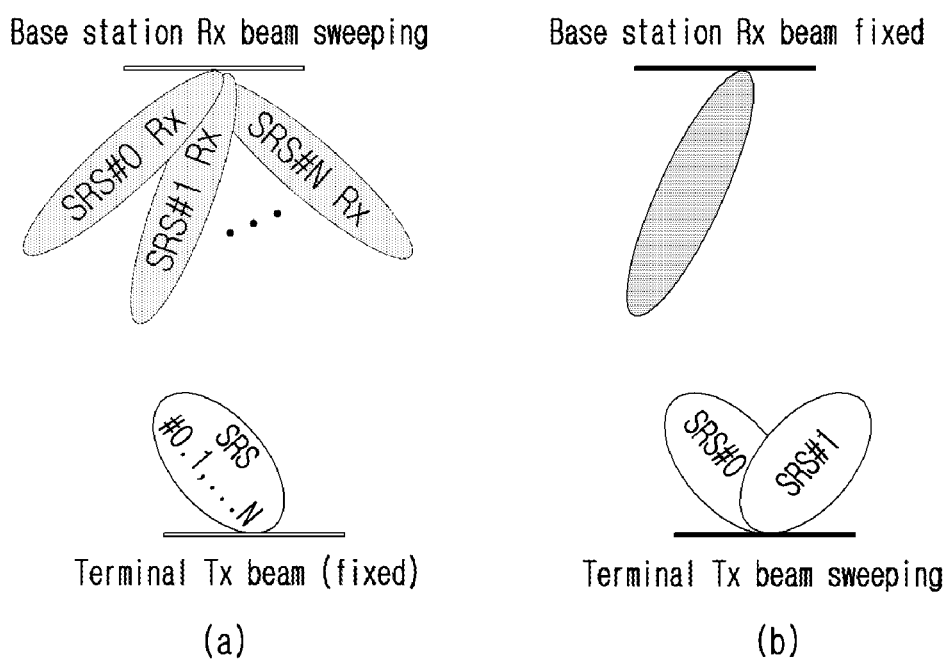
FIG. 13 is a diagram which illustrates an uplink beam management operation using SRS in a wireless communication system to which the present disclosure may be applied.

FIG. 13 is a diagram which illustrates an uplink beam management operation using SRS in a wireless communication system to which the present disclosure may be applied.

FIG. 13(a) illustrates a Rx beam determination operation of a base station and FIG. 13(b) illustrates a Tx beam sweeping operation of a terminal.

Figure 14:
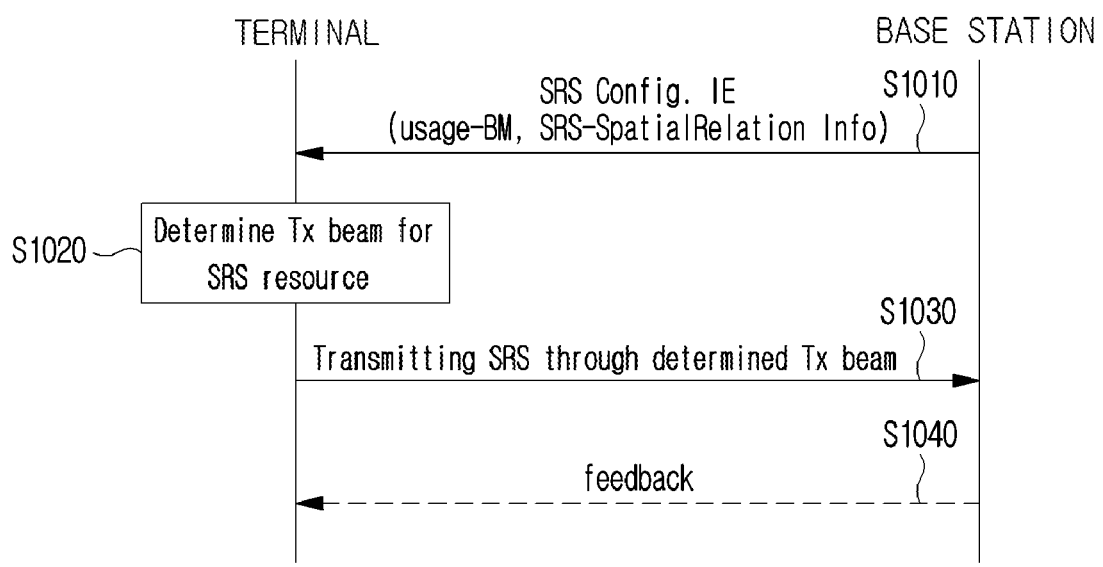
FIG. 14 is a diagram which illustrates an uplink beam management procedure in a wireless communication system to which the present disclosure may be applied.

FIG. 14 is a diagram which illustrates an uplink beam management procedure in a wireless communication system to which the present disclosure may be applied.

A terminal receives RRC signaling (e.g., an SRS-Config IE) including a (higher layer parameter) usage parameter configured as 'beam management' from a base station (S1010).

Table 8 represents an example of an SRS-Config IE (Information Element) and an SRS-Config IE is used for SRS transmission configuration. An SRS-Config IE includes a list of SRS-Resources and a list of SRS-ResourceSets. Each SRS resource set means a set of SRS-resources.

A network may trigger transmission of an SRS resource set by using configured aperiodicSRS-ResourceTrigger (L1 DCI).

TABLE 8

```
ASN1START
TAG-MAC-CELL-GROUP-CONFIG-START
SRS-Config ::=                              SEQUENCE {
srs-ResourceSetToReleaseList                SEQUENCE
 (SIZE (1..maxNrofSRS-ResourceSets))  OF    SRS-ResourceSetId
    OPTIONAL, -- Need N
srs-ResourceSetToAddModList                 SEQUENCE
 (SIZE (1..maxNrofSRS-ResourceSets))  OF    SRS-ResourceSet
    OPTIONAL, -- Need N
srs-ResourceToReleaseList                   SEQUENCE
 (SIZE (1..maxNrofSRS-Resources))     OF    SRS-ResourceId
    OPTIONAL, Need N
srs-ResourceToAddModList                    SEQUENCE
 (SIZE (1..maxNrofSRS-Resources))     OF    SRS-Resource
    OPTIONAL, -- Need N
tpc-Accumulation                            ENUMERATED {disabled}
                                            OPTIONAL, -- Need S
...
}
SRS-ResourceSet ::=                         SEQUENCE {
srs-ResourceSetId                           SRS-ResourceSetId,
srs-ResourceIdList                          SEQUENCE
 (SIZE (1..maxNrofSRS-ResourcesPerSet))  OF   SRS-ResourceId
    OPTIONAL, -- Cond Setup
resourceType                                CHOICE {
aperiodic                                   SEQUENCE {
aperiodicSRS-ResourceTrigger                INTEGER      (1..maxNrofSRS-
TriggerStates-1),
csi-RS                                      NZP-CSI-RS-ResourceId
                        OPTIONAL,           -- Cond NonCodebook
slotOffset                                  INTEGER (1..32)
                        OPTIONAL,           -- Need S
...
},
semi-persistent                             SEQUENCE {
associatedCSI-RS                            NZP-CSI-RS-ResourceId
                        OPTIONAL,           -- Cond NonCodebook
...
},
periodic                                    SEQUENCE {
associatedCSI-RS                            NZP-CSI-RS-ResourceId
                        OPTIONAL,           -- Cond NonCodebook
...
}
},
usage                                       ENUMERATED { beamManagement,
codebook, nonCodebook, antennaSwitching},
```

TABLE 8-continued

| | |
|---|---|
| alpha | Alpha |
| | OPTIONAL, -- Need S |
| p0 | INTEGER (-202..24) |
| | OPTIONAL, -- Cond Setup |
| pathlossReferenceRS | CHOICE { |
| ssb-Index | SSB-Index, |
| csi-RS-Index | NZP-CSI-RS-ResourceId |
| SRS-SpatialRelationInfo ::= | SEQUENCE { |
| servingCellId | ServCellIndex |
| OPTIONAL, -- Need S | |
| referenceSignal | CHOICE { |
| ssb-Index | SSB-Index, |
| csi-RS-Index | NZP-CSI-RS-ResourceId, |
| srs | SEQUENCE { |
| resourceId | SRS-ResourceId, |
| uplinkBWP | BWP-Id |
| } | |
| } | |
| } | |
| } | |
| SRS-ResourceId ::= | INTEGER |
| (0..maxNrofSRS-Resources-1) | |

In Table 8, usage represents a higher layer parameter which indicates whether an SRS resource set is used for beam management or is used for codebook-based or non-codebook-based transmission. A usage parameter corresponds to a L1 parameter 'SRS-SetUse'. 'spatialRelationInfo' is a parameter which represents a configuration of a spatial relation between a reference RS and a target SRS. Here, a reference RS may be a SSB, a CSI-RS or a SRS corresponding to a L1 parameter 'SRS-SpatialRelationInfo'. The usage is configured per SRS resource set. A terminal determines a Tx beam for an SRS resource which will be transmitted based on SRS-SpatialRelation Info included in the SRS-Config IE (S1020). Here, SRS-SpatialRelation Info is configured per SRS resource and represents whether the same beam as a beam used in a SSB, a CSI-RS or a SRS will be applied per SRS resource. In addition, SRS-SpatialRelationInfo may be configured or may not be configured for each SRS resource.

If SRS-SpatialRelationInfo is configured for an SRS resource, the same beam as a beam used in a SSB, a CSI-RS or a SRS is applied and transmitted. But, if SRS-SpatialRelationInfo is not configured for an SRS resource, the terminal randomly determines a Tx beam and transmits an SRS through the determined Tx beam (S1030).

In more detail, for a P-SRS that 'SRS-ResourceConfigType' is configured as 'periodic':
  i) when SRS-SpatialRelationInfo is configured as 'SSB/PBCH', a UE transmits a corresponding SRS resource by applying the same spatial domain transmission filter (or generated by a corresponding filter) as a spatial domain Rx filter used for SSB/PBCH reception; or
  ii) when SRS-SpatialRelationInfo is configured as 'CSI-RS', a UE transmits a SRS resource by applying the same spatial domain transmission filter used for periodic CSI-RS or SP (semi-persistent) CSI-RS reception; or
  iii) when SRS-SpatialRelationInfo is configured as 'SRS', a UE transmits a corresponding SRS resource by applying the same spatial domain transmission filter used for periodic SRS transmission.

Although 'SRS-ResourceConfigType' is configured as 'SP (semi-persistent)-SRS' or 'AP (aperiodic)-SRS', a beam determination and transmission operation may be applied in a way similar to the above.

Additionally, a terminal may receive or may not receive a feedback on an SRS from a base station as in the following three cases (S1040).
  i) when Spatial_Relation_Info is configured for all SRS resources in a SRS resource set, a terminal transmits an SRS with a beam indicated by a base station. For example, when Spatial_Relation_Info indicates all the same SSB, CRI or SRI, a terminal repetitively transmits an SRS with the same beam. This case corresponds to FIG. 13(a) as a usage for a base station to select an Rx beam.
  ii) Spatial_Relation_Info may not be configured for all SRS resources in an SRS resource set. In this case, a terminal may transmit with freely changing SRS beams. In other words, this case corresponds to FIG. 13(b) as a usage for a terminal to sweep Tx beams.
  iii) Spatial_Relation_Info may be configured only for a part of SRS resources in an SRS resource set. In this case, for a configured SRS resource, an SRS may be transmitted with an indicated beam, and for a SRS resource that Spatial_Relation_Info is not configured an SRS may be transmitted by randomly applying a Tx beam by a terminal.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

Here, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number(S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resourece setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Reporting For CSI reporting, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset (Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Quasi-co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot n+3$N_{slot}$ subframe, u+1. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDurationForQCL), UE may assume that a DMRS port of a PDSCH of a serving cell is quasi-colocated with RS(s) for QCL parameter(s) used for PDCCH QCL indication of a CORESET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).

QCL-TypeC with a SS/PBCH block, and if applicable, QCL-TypeD with the same SS/PBCH block, or QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-Resource-Set including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a SS/PBCH block, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or when QCL-TypeD is not applicable, QCL-TypeB with a CSI-RS resource in configured NZP-CSI-RS-ResourceSet including a higher layer parameter trs-Info For a CSI-RS resource of configured NZP-CSI-RS-ResourceSet including a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeC with a SS/PBCH block, and if applicable, QCL-TypeD with the same SS/PBCH block.

For a DMRS of a PDCCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Spatial Parameter based Uplink/Downlink Signal Transmission and Reception

Hereinafter, various examples of the present disclosure about a spatial parameter set or candidates of a spatial parameter set configured based on a predetermined threshold and beam switching timing of a terminal are described.

In addition, hereinafter, various examples of the present disclosure that a terminal performs downlink signal reception or uplink signal transmission are described by using a spatial parameter set based on a predetermined threshold and beam switching timing of a terminal.

In a NR system, when a terminal performs reception beamforming, it may report time required for beam change (or beam switching) to a base station (e.g., gNB, eNB, etc.). For example, time required by a terminal from an occasion of receiving DCI including triggering information on an aperiodic (AP) CSI-RS until an occasion of receiving an AP CSI-RS triggered by the DCI may be reported by a terminal to a base station as a parameter, beamSwitchTiming (BST). For example, BST may be reported to a base station by being selected among {14, 28, 48, 224, 336} symbols. In addition, a time domain length of one symbol is different according to SCS, so BST may need a different value per SCS supported by a terminal. Accordingly, a different BST value may be reported for FR and/or SCS and for example, a BST value may be reported for SCS=60 kHz and SCS=120 kHz corresponding to FR2, respectively.

A BST value is necessary because a terminal may not know which CSI-RS resource is indicated by DCI until completing interpretation of DCI. In more detail, it is because certain time for processing of a terminal is required to apply a beam optimized for reception of a CSI-RS indicated by DCI. In addition, an additional reason why BST is required is that when a terminal is equipped with a plurality of reception panels, it takes time to activate other deactivated panel or switch a panel in order to perform reception of a corresponding CSI-RS after DCI reception and a subsequent operation of CSI-RS reception (e.g., CSI reporting, beam management, time/frequency tracking, etc.). For example, large values like BST={224, 336} may be deemed corresponding to a value that a terminal may report by considering such panel activation/switching delay. Accordingly, a BST value may be configured with the sum of time required for DCI reception and processing and time required for beam switching (e.g., panel activation/switching). For example, a terminal reporting a value of one of BST={14, 28, 48} may be deemed to have no time required for panel activation/switching or ignore it.

A spatial parameter which will be applied by a terminal to downlink reception or uplink transmission may be different based on BST and a predetermined threshold (hereinafter, for convenience of a description, referred to as a BAR value).

For example, when an AP CSI-RS is transmitted before BAR, a terminal may receive a corresponding AP CSI-RS based on a QCL reference RS of other DL RS/channel (e.g., a default CORESET which is a standard for performing buffering or other DL signal/channel transmitted in the same symbol as a corresponding AP CSI-RS), not a QCL reference RS configured for a corresponding AP CSI-RS. Alternatively, when an AP CSI-RS is transmitted after BAR, a corresponding AP CSI-RS may be received based on a QCL reference RS configured for a corresponding AP CSI-RS.

Here, the BAR value may mean a threshold related to an occasion or timing that a CSI/BM related reference signal (e.g., an AP CSI-RS, etc.) is transmitted/received. For example, the BAR value may be a threshold related to a scheduling offset between a last symbol of a PDCCH carrying triggering DCI and a first symbol of an aperiodic CSI-RS resource. A reference signal for a space related (e.g., QCL related) assumption for a CSI/BM related reference signal may be determined/configured based on such a BAR value. A term of a BAR value in the present disclosure may be understood/interpreted according to technical contents described in examples of the present disclosure and does not limit a scope of the present disclosure.

For example, BAR may be configured as a different value according to BST. For example, for one of BST={14, 28, 48}, BAR may be BST and for one of BST={224, 336}, BAR may be 48. Here, a reference threshold may correspond to 48. In other words, for a BST value equal to or less than a reference threshold, a BAR value may be configured to be the same as BST and for a BST value exceeding a reference threshold, a BAR value may be configured to be the same as a reference threshold.

For example, when a terminal which reported a value of one of BST={224, 336} receives a CSI-RS within 48 symbols, a reference threshold, from a DCI reception occasion, based on a default beam which performed buffering (without panel switching), or based on a reception beam corresponding to a TCI state configured for other DL channel/RS overlapped with a corresponding symbol, it may receive a corresponding CSI-RS. When a terminal which reported a value of one of BST={224, 336} receives a CSI-RS within a BST value and after 48 symbols, a reference threshold, from a DCI reception occasion, it may receive an AP CSI-RS according to QCL reference RS information of an indicated CSI-RS (based on a reception beam in a panel which received DCI without panel switching). When a terminal which reported a value of one of BST={224, 336} receives a CSI-RS after a BST value (and after a reference threshold), it may receive an AP CSI-RS according to QCL reference RS information of an indicated CSI-RS (based on a reception beam of a panel which received DCI and other panel).

Figure 16:
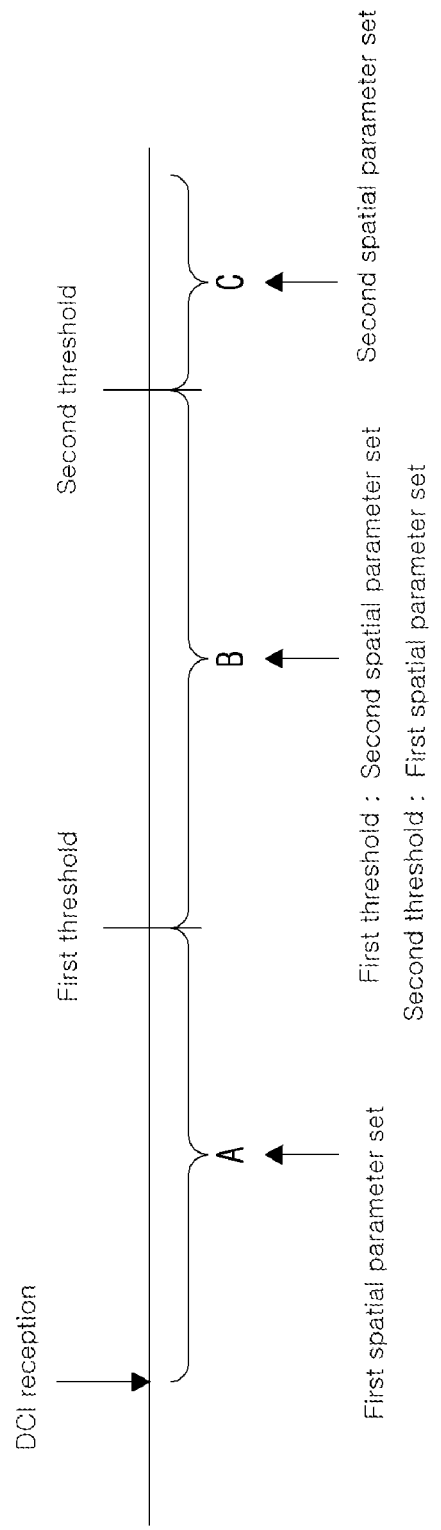
FIG. 16 is a diagram for describing beam switching timing of a terminal according to an embodiment of the present disclosure.

In reference to the after-described example of FIG. 16, when a first reference threshold is configured as 48 symbols, a first spatial parameter set (e.g., a default beam or other overlapped DL channel/RS) may be applied when downlink reception/uplink transmission triggered/scheduled by DCI is performed within a first threshold smaller than 48 symbols and a second spatial parameter set (e.g., a QCL reference RS configured for a corresponding downlink reception/uplink transmission signal/channel) may be applied when downlink reception/uplink transmission triggered/scheduled by DCI is performed after a first reference threshold, 48 symbols.

For example, a spatial parameter set applied to aperiodic CSI-RS reception is described in more detail as follows.

For each aperiodic CSI-RS resource of a CSI-RS resource set associated with each CSI triggering state, through higher layer signaling qcl-info including a list of references for a TCI state for an aperiodic CSI-RS resource associated with a CSI triggering state, UE may receive an indication on a QCL configuration for QCL RS source(s) and QCL type(s). When a state included in the list is configured as a reference for a RS associated with QCL-TypeD, a corresponding RS may be a SS/PBCH block positioned at the same or different CC/DL BWP, or may be a periodically or semi-persistently configured CSI-RS resource positioned at the same or different CC/DL BWP.

Here, when a scheduling offset between a last symbol of a PDCCH carrying triggering DCI and a first symbol of an aperiodic CSI-RS resource of NZP-CSI-RS-ResourceSet configured without a higher layer parameter trs-info is smaller than a predetermined threshold (e.g., beamSwitchTiming) related to beam switching time reported by a UE when the reported value of the threshold is one of {14, 28, 48}, or when the scheduling offset is smaller than 48 when the reported value is one of {224, 336}, an operation may be performed as follows.

If there is other DL signal having a TCI state indicated in the same symbol as a CSI-RS, UE may apply a QCL assumption of the other DL signal even when receiving an aperiodic CSI-RS. The other DL signal may correspond to a PDSCH scheduled with an offset equal to or greater than a timeDurationForQCL threshold, an aperiodic CSI-RS scheduled with an offset equal to or greater than that when a value of a beamSwitchTiming threshold reported by UE is one of {14, 28, 48}, an aperiodic CSI-RS scheduled with an offset equal to or greater than that when a value of a beamSwitchTiming threshold reported by UE is one of {224, 336}, a periodic CSI-RS, a semi-persistent CSI-RS.

If there is no other DL signal having a TCI state indicated in the same symbol as a CSI-RS, when receiving an aperiodic CSI-RS, UE may apply a QCL assumption used for a CORESET associated with a monitored search space having the lowest controlResourceSetId in the latest slot that one or more CORESETs in an activated BWP of a serving cell are monitored.

When a scheduling offset between a last symbol of a PDCCH carrying triggering DCI and a first symbol of an aperiodic CSI-RS resource is equal to or greater than a predetermined threshold (e.g., beamSwitchTiming) related to beam switching time reported by UE when a reported value of the threshold is one of {14, 28, 48}, or when the scheduling offset is equal to or greater than 48 when the reported value is one of {224, 336}, UE may expect to apply a QCL assumption of an indicated TCI state to an aperiodic CSI-RS resource of a CSI triggering state indicated by a CSI trigger field of DCI.

If only one reference threshold (e.g., 48 symbols) is applied to a terminal, a problem may occur that it is hard to apply a valid spatial parameter set according to terminal capability.

For example, in a wireless communication system under study to support a frequency band higher than FR1 and FR2 in Table 2 (e.g., FR3 or FR4), it may be required to support SCS higher than 120 kHz. A symbol duration in high SCS (e.g., exceeding 120 kHz) is shorter than a symbol duration in SCS of 120 kHz. When a terminal supporting such a short symbol duration has capability of BST longer than a reference threshold, 48 symbols, (e.g., 224 or 336 symbols), even when downlink reception or uplink transmission is performed at an occasion after a reference threshold (e.g., 48 symbols) from a DCI detection/reception occasion, a problem may occur that it is difficult to apply a spatial parameter set configured/indicated for corresponding downlink reception/uplink transmission. In other words, despite a length of the same 48 symbols, as SCS gets larger, an absolute time length gets shorter, so a problem may occur that a terminal does not have enough time to receive and process DCI and perform beam switching.

To solve such a problem, the present disclosure describes various examples defining or configuring an additional reference threshold.

Figure 15:
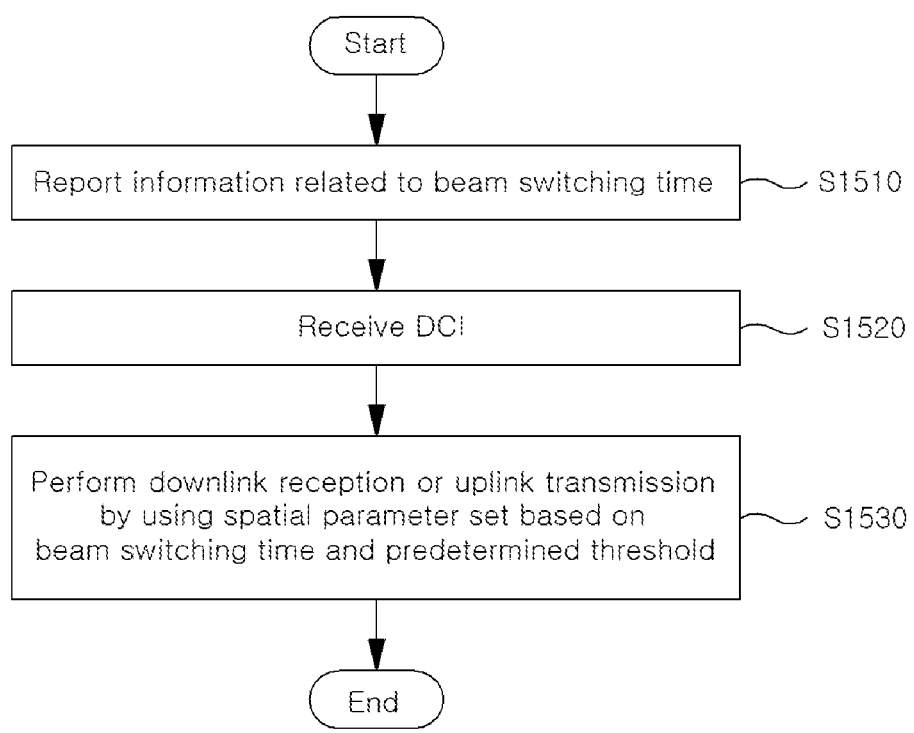
FIG. 15 is a flow chart for describing a beam switching operation of a terminal according to the present disclosure.

FIG. 15 is a flow chart for describing a beam switching operation of a terminal according to the present disclosure.

In S1510, a terminal may report beam switching time related information to a base station.

Beam switching time related information may be pre-transmitted by a terminal to a base station as terminal capability information. As described later, beam switching time may include time required for processing of a terminal from an occasion that a terminal receives DCI until performing downlink signal reception or uplink signal transmission scheduled or triggered by the DCI. Here, time required for processing of a terminal may include time that a terminal processes DCI and prepares downlink signal reception or uplink signal transmission.

In S1520, a terminal may receive downlink control information (DCI) from a base station.

DCI may include triggering information or scheduling information on a downlink signal (or channel) to be received by a terminal. Alternatively, DCI may include triggering information or scheduling information on an uplink signal (or channel) to be transmitted by a terminal. For example, DCI may include triggering/scheduling related information on a downlink signal/channel such as aperiodic CSI-RS triggering, PDSCH scheduling, etc. and may include triggering/scheduling related information on an uplink signal/channel such as aperiodic SRS transmission, PUSCH scheduling, etc.

In S1530, a terminal may perform downlink signal/channel reception or uplink signal/channel transmission corresponding to the DCI by using a spatial parameter set based on a predetermined threshold and beam switching time.

A downlink or uplink signal/channel corresponding to DCI may include a downlink or uplink signal/channel triggered/scheduled by DCI.

Based on a predetermined threshold and beam switching time, a spatial parameter set used for downlink or uplink signal/channel transmission and reception may be determined among spatial parameter set candidates.

Spatial parameter set candidates may include a first spatial parameter set applied when a downlink reception/uplink transmission occasion is equal to or less then (or below) a predetermined threshold and a second spatial parameter set applied when a downlink reception/uplink transmission occasion exceeds (or is equal to or greater than) a predetermined threshold.

Here, a predetermined threshold may correspond to one threshold among a plurality of threshold candidates. A plurality of threshold candidates may be preconfigured as a different value based on one or more of terminal capability, SCS (Subcarrier Spacing), a FR (Frequency Range) (or a frequency position, or a center frequency position), a CP (Cyclic Prefix) related configuration (e.g., a CP length/type) or may be predetermined between a terminal and a base station without separate signaling.

FIG. 16 is a diagram for describing beam switching timing of a terminal according to an embodiment of the present disclosure.

An example of FIG. 16 is just to describe a relative relationship of terminal operation timing related to examples of the present disclosure, and it does not limit an absolute position or size in a time domain.

In an example of FIG. 16, it is described by assuming that a plurality of spatial parameter set candidates include a first and second spatial parameter set, but a scope of the present disclosure is not limited thereto, and even for 3 or more spatial parameter set candidates, examples of the present disclosure may be applied.

In addition, in an example of FIG. 16, it is described by assuming that a plurality of threshold candidates include a first and second threshold, but a scope of the present disclosure is not limited thereto, and even for 3 or more threshold candidates, examples of the present disclosure may be applied.

An example of FIG. 16 represents cases that an occasion when a terminal detects/receives DCI and timing of downlink reception or uplink transmission performed based on corresponding DCI are included in Duration A, B, or C.

In an example of FIG. 16, a first threshold and a second threshold may be defined as a difference (or offset) value with a DCI detection/reception occasion. Duration A may be distinguished as a duration which is equal to or less than (or below) a first threshold from a DCI reception occasion, Duration B may be distinguished as a duration which exceeds (or is equal to or greater than) a first threshold and is equal to or less than (or below) a second threshold and Duration C may be distinguished as a duration which exceeds (or is equal to or greater than) a second threshold.

In addition, a first threshold or a second threshold may be configured based on BST reported by a terminal to a base station in relation to FIG. 15. For example, when a BST value is equal to or less than a first or second reference threshold, a first or second threshold is configured to be the same as a BST value and when a BST value exceeds a first or second reference threshold, a first or second reference threshold is applied as a first or second threshold as it is.

When a first threshold is applied to a terminal, a first spatial parameter set may be applied when downlink reception/uplink transmission triggered/scheduled by DCI belongs to Duration A and a second spatial parameter set may be applied when downlink reception/uplink transmission triggered/scheduled by DCI belongs to Duration B or C. In more detail, in Duration B or C, when downlink reception/uplink transmission is performed within BST, a second spatial parameter set may be applied without beam switching and when downlink reception/uplink transmission is performed after BST, a second spatial parameter set may be applied with beam switching.

When a second threshold is applied to a terminal, a first spatial parameter set may be applied when downlink reception/uplink transmission triggered/scheduled by DCI belongs to Duration A or B and a second spatial parameter set may be applied when downlink reception/uplink transmission triggered/scheduled by DCI belongs to Duration C. In more detail, in Duration C, when downlink reception/uplink transmission is performed within BST, a second spatial parameter set may be applied without beam switching and when downlink reception/uplink transmission is performed after BST, a second spatial parameter set may be applied with beam switching.

Here, a first spatial parameter set may correspond to a default spatial parameter set or a spatial parameter set related to reception of DCI. For example, when a terminal receives DCI and performs downlink reception or uplink transmission triggered/scheduled by corresponding DCI within a first or second threshold, a first spatial parameter set may be applied.

Alternatively, a second spatial parameter set may correspond to a spatial parameter set configured for downlink reception or uplink transmission triggered/scheduled by DCI. For example, when a terminal receives DCI and performs downlink reception or uplink transmission triggered/scheduled by corresponding DCI after a first or second threshold, a second spatial parameter set may be applied.

Here, a spatial parameter set may include QCL information (or a QCL reference RS). For example, for a downlink, a TCI state and for an uplink, spatial relation RS information may be included in a spatial parameter set.

Embodiment 1

This embodiment is about a method of determining or configuring a reference threshold based on a threshold for SCS (e.g., a SCS threshold) and a threshold for BST (e.g., a BST threshold).

For example, when SCS is below (or equal to or less than) a SCS threshold or BST is below (or equal to or less than) a BST threshold, a first threshold may be configured based on a first reference threshold. Alternatively, when SCS is equal to or greater than (or exceeds) a SCS threshold and BST is equal to or greater than (or exceeds) a BST threshold, a second threshold may be configured based on a second reference threshold. Here, a second reference threshold may be greater than a first reference threshold.

For example, a first threshold may be applied based on a first reference threshold (e.g., 48) for a terminal supporting SCS equal to or less than 120 kHz, a SCS threshold (regardless of BST). For example, when BST reported by a terminal is equal to or less than 48, a first reference threshold, a first threshold (or first BAR) may be applied in the same way as BST and when BST reported by a terminal exceeds 48, a first reference threshold, a first threshold (or first BAR) may be applied in the same way as 48, a first reference threshold.

For example, a first threshold may be applied based on a first reference threshold (e.g., 48) for a terminal supporting BST equal to or less than 48, a BST threshold (regardless of SCS). For example, when BST reported by a terminal is equal to or less than 48, a first reference threshold, a first threshold (or first BAR) may be applied in the same way as BST.

For example, a second threshold may be applied based on a second reference threshold (e.g., 96) for a terminal supporting SCS exceeding 120 kHz, a SCS threshold and supporting BST exceeding 48, a BST threshold. For example, when BST reported by a terminal is equal to or less than 96, a second reference threshold, a second threshold (or second BAR) may be applied in the same way as BST and when BST reported by a terminal exceeds 96, a second reference threshold, a second threshold (or second BAR) may be applied in the same way as 96, a second reference threshold.

For example, for a terminal which reported BST equal to or greater than a specific value for new SCS (>120 kHz) (e.g., one of BST={224, 336}), a BAR value higher than 48 may be stipulated. For example, a BAR value applied to a terminal which reported one of BST={224, 336} may be changed according to corresponding SCS. For example, for a terminal which reported BST={224, 336}, it may be defined/configured as BAR=48 symbols for SCS={60, 120} kHz and it may be defined/configured as BAR=96 symbols for SCS={240, 480} kHz.

As such, a BAR value (e.g., a BAR value, a threshold which is a standard for determining a spatial parameter set applied to AP CSI-RS reception) may be configured/defined based on (or by considering) SCS and BST.

224 or 336 as a BST value in the above-described example is just an example, and it does not limit a scope of the present disclosure. In addition, as new SCS is supported in the present disclosure, new BST candidate values (e.g., 96, 448, etc.) may be additionally defined and in this case, a BST threshold may be defined as a value larger than 48 without being limited to 48. In addition, a second threshold according to a second reference threshold may be applied to all or part of BST candidate value(s) larger than a second reference threshold (e.g., a BAR value defined to support new SCS (e.g., 96, a second reference threshold)).

Embodiment 2

This embodiment is about a method that one or more of a reference threshold candidate, a BST candidate value, or a BST set is defined/configured based on SCS and/or terminal capability.

According to embodiment 1, a first or second reference threshold which will be applied to a terminal reporting a BST value equal to or greater than a BST threshold may by defined as a specific value (or a fixed value) according to SCS. But, time required until DCI decoding is completed (without performing beam/channel switching) may be different per terminal. For example, despite BST=336 in SCS=480 kHz, some terminals may complete DCI decoding in the same beam/panel as DCI reception beam/panel within 48 symbols, while other terminals may complete it within 96 symbols. In this case, a terminal that a higher threshold (or BAR value) is required is generally UE having low performance (or low end) and may select and report one of higher BST values and a terminal that a lower threshold (or BAR value) is required is generally UE having high performance (or high end or advanced) and may select and report one of lower BST values. Considering it, a reference threshold may be configured/defined based on capability of a terminal and/or SCS supported by a terminal.

For example, a threshold (or a BAR value) applied to specific SCS according to a terminal may be configured/defined differently. Additionally or alternatively, a configuration/a scope of BST candidate values may be differently configured/defined according to a threshold (or a BAR value). Additionally or alternatively, a plurality of BST sets with a different scope or configuration of BST candidate values may be configured/defined for specific SCS. Additionally or alternatively, a threshold (or a BAR value) may be differently configured/defined per BST set. A threshold (or a BAR value) applied according to a terminal may be configured/defined as a different value based on one or more of capability, a type or a category of a terminal or a configuration/an indication of a base station.

For example, a plurality of BST sets may be configured/defined as a different combination of BST candidates. For example, a different BST set may have a different scope of BST candidates, may have different granularity of BST candidates, may have the same or different number of BST candidates and some BST candidate(s) may be overlapped. For example, a first BST set may be {14, 28, 48, 224, 336} and a second BST set may be {28, 56, 96, 336, 448}.

For example, a corresponding threshold (or BAR value) may be differently configured/defined per BST set. For example, a reference threshold for a first BST set may be 48 symbols and a reference threshold for a second BST set may be 96 symbols.

A terminal may report to a base station information on which set of a plurality of BST sets will be selected/applied and information on which BST value in a corresponding set will be selected/applied.

As an additional example, according to a type/a category of a terminal, which threshold (or BAR value) and/or BST set will be applied may be configured/defined. For example, a BST set and/or a BAR value which will be applied to MTC, IoT, a vehicle terminal may be configured/defined differently from a BST set and/or BAR value which will be applied to an eMBB terminal like a handset.

Embodiment 3

This embodiment is about a method of differently configuring/defining a threshold (or a BAR value) based on a CP related configuration. For example, based on whether to apply an extended CP (ECP) and/or a CP length, a threshold (or a BAR value) may be configured/defined.

As an interval between samples gets shorter when new SCS (e.g., SCS larger than the existing SCS) is applied, a normal CP length may not cover the maximum delay spread according to a communication environment, so an ECP based waveform generation method may be applied. As a symbol duration is different according to a CP type/length, a threshold (or a BAR value) which is related to DCI processing and beam switching of a terminal and is a standard for applying a spatial parameter set may be applied based on a CP type/length.

When a threshold (or a BAR value) is configured/defined by considering or based on a CP type or length, a threshold (or a BAR value) applied to a CP with a first type/length may be the same as or different from a threshold (or a BAR value) applied to a CP with a second type/length. In a different case, a threshold (or a BAR value) applied to a CP with a first type/length may be greater than a threshold (or a BAR value) applied to a CP with a second type/length. For example, an ECP supports a symbol duration longer than a normal CP, so a threshold (or a BAR value) applied to an ECP may be configured/defined as a value which is smaller/lower than a threshold (or a BAR value) applied to a normal CP.

The above-described embodiments may be applied independently or may be entirely or partially combined and applied.

In addition, the above-described embodiments described a reference threshold (or BAR value) which determines a QCL reference RS when receiving an AP CSI-RS as a main example, but a scope of the present disclosure is not limited thereto. For example, examples of the present disclosure may be also applied to a threshold which determines a spatial parameter set which will be applied to downlink transmission and/or uplink transmission related to time required for beam switching of a terminal.

For example, in applying a different QCL assumption for a PDSCH/a DMRS by comparing time from DCI reception to a PDSCH reception occasion with a predetermined threshold (e.g., a value of timeDurationForQCL), a reference threshold for the predetermined threshold may be applied as one of a plurality of candidate values. For example, when a capability value reported by a terminal exceeds a reference threshold, the reference threshold may be applied as the predetermined threshold. Alternatively, when a capability value reported by a terminal is equal to or less than a reference threshold, the capability value may be applied as the predetermined threshold. Candidates of the reference threshold may be configured/defined differently based on one or more of SCS, a FR (or a frequency position, or a center frequency position), terminal capability, or a CP related configuration (e.g., a CP length/type).

As an additional example, in determining a spatial relation RS which will be applied to AP SRS transmission, or in determining a spatial relation RS which will be applied to PUSCH transmission, a different spatial relation RS may be applied based on a predetermined threshold and here, a reference threshold for the predetermined threshold may be applied as one of a plurality of candidate values. For example, when a capability value reported by a terminal exceeds a reference threshold, the reference threshold may be applied as the predetermined threshold. Alternatively, when a capability value reported by a terminal is equal to or less than a reference threshold, the capability value may be applied as the predetermined threshold. Candidates of the reference threshold may be configured/defined differently based on one or more of SCS, a FR (or a frequency position, or a center frequency position), capital capability, or a CP related configuration (e.g., a CP length/type).

Figure 17:
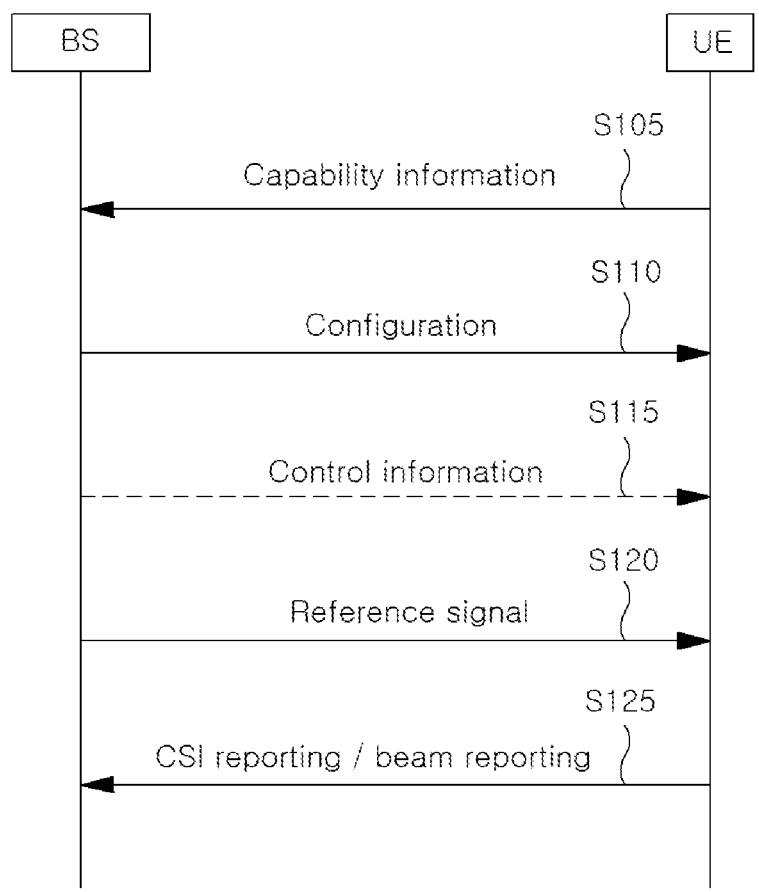
FIG. 17 is a diagram for describing a signaling process according to an embodiment of the present disclosure.

FIG. 17 is a diagram for describing a signaling process according to an embodiment of the present disclosure.

An example of a signaling operation of a base station and a terminal for the above-described embodiments may be as in FIG. 17. Here, a terminal/a base station is just an example, and may be applied by being substituted with a variety of devices as described in FIG. 18. As FIG. 17 is for convenience of a description, it does not limit a scope of the present disclosure. In addition, some of steps described in FIG. 17 may be merged or omitted. In addition, a CSI related operation or a beam management operation is assumed in performing procedures described below, but a scope of the present disclosure is not limited thereto, and it may be applied to a variety of downlink reception or uplink transmission operations.

A terminal may transmit capability information to a base station S105. In other words, a base station may receive capability information from UE. For example, the capability information may include beam management/CSI related information, information on a terminal (e.g., a terminal category, etc.), etc. For example, as in the above-described embodiments, the capability information may include time information (e.g., BST, etc.) related to beam activation/change which may be supported by a terminal. In an example, as in embodiment 2, when a plurality of sets of BST candidate values are configured, indication/selection information on a set supported by a terminal among the plurality of sets may be included in the capability information. The operation in S105 may be omitted in some cases.

For example, the above-described operation in S105 that a terminal (100/200 in FIG. 18) transmits the capability information to a base station (200/100 in FIG. 18) may be implemented by a device in FIG. 18 which will be described below. For example, in reference to FIG. 18, one or more processors 102 may control one or more transceivers 106 and/or one or more memories 104, etc. to transmit the capability information and one or more transceivers 106 may transmit capability information to a base station.

A terminal may receive configuration information from a base station S110. In other words, a base station may transmit a configuration to UE. The configuration may include one or more of system information (SI), scheduling information, a BM (Beam management) related configuration (e.g., DL BM related CSI-ResourceConfig IE, NZP CSI-RS resource set IE, etc.), a CSI related configuration. For example, the configuration may include beam configuration information (e.g., spatial relation assumption information) of a reference signal for CSI/BM. In an example, the beam configuration information may include reference signal related information for a QCL relationship. The configuration may be transmitted through higher layer (e.g., RRC or MAC CE) signaling. In addition, when the configuration information is predefined or preconfigured, a corresponding step may be omitted.

For example, the above-described operation in S110 that a terminal (100/200 in FIG. 18) receives the configuration from a base station (200/100 in FIG. 18) may be implemented by a device in FIG. 18 which will be described below. For example, in reference to FIG. 18, one or more processors 102 may control one or more transceivers 106 and/or one or more memories 104, etc. to receive the configuration and one or more transceivers 106 may receive the configuration from a base station.

A terminal may receive control information from a base station S115. In other words, a base station may transmit control information to UE. For example, the control information may be DCI and may be received through a PDCCH. For example, the control information may include information triggering aperiodic CSI reporting (e.g., including beam related reporting). In some cases, S115 may be omitted.

For example, the above-described operation in S115 that a terminal (100/200 in FIG. 18) receives the control information from a base station (200/100 in FIG. 18) may be implemented by a device in FIG. 18 which will be described below. For example, in reference to FIG. 18, one or more processors 102 may control one or more transceivers 106 and/or one or more memories 104, etc. to receive the control information and one or more transceivers 106 may receive the control information from a base station.

A terminal may receive a reference signal (e.g., a CSI-RS) from a base station S120. The reference signal may be related to channel state reporting/beam reporting. For example, the reference signal may be received based on the beam configuration information. For example, the reference signal may be received by applying a spatial relation assumption (e.g., a QCL relationship) based on the above-described embodiments. For example, the spatial relation assumption may be differently applied based on the above-described information triggering aperiodic CSI reporting and a timing offset that the reference signal is received. With this regard, a specific threshold (e.g., a BAR value in the above-described embodiments) may be configured/defined based on the above-described embodiments. For example, a specific threshold (or a BAR value) may be configured/defined based on BST transmitted through SCS and capability information. For example, a specific threshold (or a BAR value) may be configured/defined differently according to a terminal (e.g., a type/a category of a terminal). For example, a specific threshold (or a BAR value) may be configured/defined differently per set of BST candidate values. For example, a specific threshold (or a BAR value) may be configured/defined based on (or by considering) a CP length. For example, when the time offset is within the specific threshold, the reference signal may be received by applying a spatial relation assumption (e.g., a QCL relationship) of other RS or CORESET. For example, when the timing offset is equal to or greater than (or exceeds) the specific threshold value, the reference signal may be received by applying a spatial relation assumption (e.g., a QCL relationship) configured for a corresponding reference signal. For example, the specific threshold value may be configured/defined as one of a plurality of candidate values. For example, a plurality of candidates of the specific threshold value may include a first threshold value (e.g., a value equal to or less than 48) and a second threshold value (e.g., a value larger than 48).

For example, the above-described operation in S120 that a terminal (100/200 in FIG. 18) receives the reference signal from a base station (200/100 in FIG. 18) may be implemented by a device in FIG. 18 which will be described below. For example, in reference to FIG. 18, one or more processors 102 may control one or more transceivers 106 and/or one or more memories 104, etc. to receive the reference signal and one or more transceivers 106 may receive the reference signal from a base station.

A terminal may perform CSI measurement/beam related measurement based on a received reference signal and perform CSI reporting/beam reporting to a base station S125. For example, the above-described beam management operation/CIS related operation may be applied to perform CSI reporting/beam reporting.

For example, the above-described operation in $125 that a terminal (100/200 in FIG. 18) performs the CSI reporting/beam reporting to a base station (200/100 in FIG. 18) may be implemented by a device in FIG. 18 which will be described below. For example, in reference to FIG. 18, one or more processors 102 may control one or more transceivers 106 and/or one or more memories 104, etc. to perform the CSI reporting/beam reporting and one or more transceivers 106 may perform the CSI reporting/beam reporting to a base station.

As described above, the above-described base station/terminal operation (e.g., embodiment 1, 2, 3, an example of FIG. 15, FIG. 16, to FIG. 17, etc.) may be implemented by a device (e.g., 100/200 in FIG. 18) which will be described below. For example, a terminal may correspond to a first wireless device and a base station may correspond to a second wireless device and in some cases, the opposite may be considered.

Figure 18:
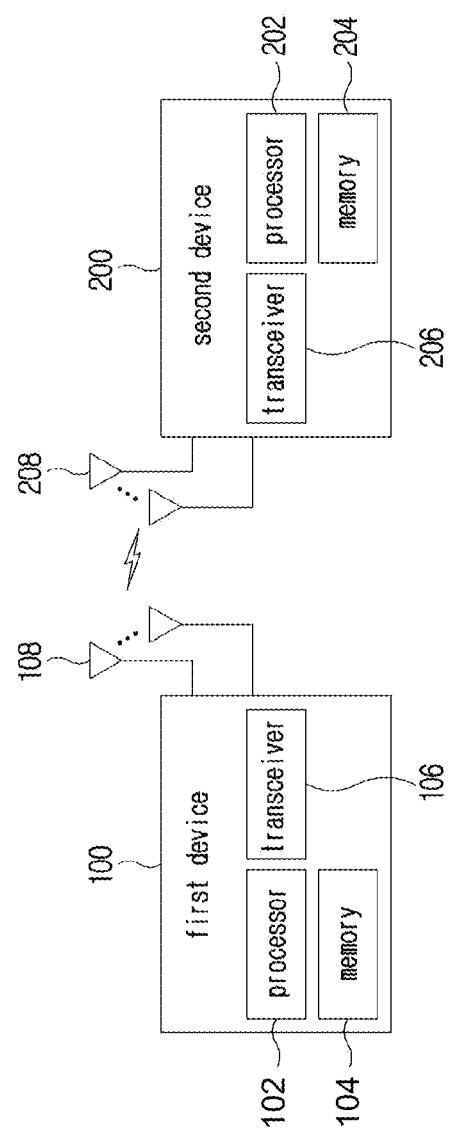
FIG. 18 is a diagram which illustrates a block diagram of a wireless communication system according to an embodiment of the present disclosure.

For example, the above-described base station/terminal operation (e.g., embodiment 1, 2, 3, an example of FIG. 15, FIG. 16, to FIG. 17, etc.) may be processed by one or more processors in FIG. 18 (e.g., 102, 202) and the above-described base station/terminal operation (e.g., embodiment 1, 2, 3, an example of FIG. 15, FIG. 16, to FIG. 17) may be stored in a memory (e.g., one or more memories in FIG. 18 (104, 204)) in a form of a command/a program (e.g., an instruction, an executable code) for driving at least one processor in FIG. 18 (e.g., 102, 202).

General Device to which the Present Disclosure May be Applied

FIG. 18 is a diagram which illustrates a block diagram of a wireless communication system according to an embodiment of the present disclosure.

In reference to FIG. 18, a first device/wireless device 100 and a second device/wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (LOW Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat S1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:
1. A method performed by a terminal in a wireless communication system, the method comprising:
reporting, to a base station, information related to beam switching timing of the terminal;
receiving, from the base station, downlink control information (DCI) including information for triggering a channel state information-reference signal (CSI-RS) reception; and
performing the CSI-RS reception by applying a first quasi co-location (QCL) assumption based on a transmission configuration indicator (TCI) state for the CSI-RS or a second QCL assumption based on a TCI state for another downlink signal, based on the reported beam switching timing and a predetermined threshold, wherein the predetermined threshold is based on a subcarrier spacing, and wherein, based on a subcarrier spacing value being higher than a predetermined subcarrier spacing value, the predetermined threshold has a different value based on the subcarrier spacing.

2. The method of claim 1, wherein:

based on the subcarrier spacing value being equal to or lower than the predetermined subcarrier spacing value, the predetermined threshold is 48, and based on the subcarrier spacing value being higher than the predetermined subcarrier spacing value, the predetermined threshold is larger than 48.

3. The method of claim 1, wherein:

the beam switch timing is selected from a set among a plurality of sets of the beam switch timing candidates.

4. The method of claim 3, wherein:

a first set includes the beam switch timing candidates of 14, 28, 48, 224, and 336, and the second set includes the beam switch timing candidates 224 and 336.

5. The method of claim 1, wherein:

the first QCL assumption is applied based on a scheduling offset between a time of receiving the DCI and a time of the CSI-RS reception being equal to or larger than the predetermined threshold, and the second QCL assumption is applied based on the scheduling offset being smaller than the predetermined threshold.

6. At least one non-transitory medium which is readable by at least one processor and storing at least one instruction cause the at least one processor to perform the method of claim 1.

7. A terminal in a wireless communication system, the terminal comprising:

at least one transceiver; and at least one processor connected to the at least one transceiver, wherein the at least one processor is configured to:

report, through the at least one transceiver to a base station, information related to beam switching timing of the terminal;

receive, from the base station through the at least one transceiver, downlink control information (DCI) triggering a channel state information-reference signal (CSI-RS) reception; and perform, through the at least one transceiver, the CSI-RS reception by applying a first quasi co-location (QCL) assumption based on a transmission configuration indicator (TCI) state for the CSI-RS or a second QCL assumption based on a TCI state for another downlink signal, based on the reported beam switching timing and a predetermined threshold, wherein the predetermined threshold is based on a subcarrier spacing, wherein, based on a subcarrier spacing value being higher than a predetermined subcarrier spacing value, the predetermined threshold has a different value based on the subcarrier spacing.

8. A processing unit configured to control a terminal in a wireless communication system, the processing unit comprising:

at least one processor; and at least one computer memory which is operably connected to the at least one processor and stores instructions performing operations based on being executed by the at least one processor, wherein the operations include:

reporting, to a base station, information related to beam switching timing of the terminal;

receiving, from the base station, downlink control information (DCI) including information for triggering a channel state information-reference signal (CSI-RS) reception; and performing the CSI-RS reception by applying a first quasi co-location (QCL) assumption based on a transmission configuration indicator (TCI) state for the CSI-RS or a second QCL assumption based on a TCI state for another downlink signal, based on the reported beam switching timing and a predetermined threshold, wherein the predetermined threshold is based on a subcarrier spacing, and wherein, based on a subcarrier spacing value being higher than a predetermined subcarrier spacing value, the predetermined threshold has a different value based on the subcarrier spacing.

* * * * *